United States Patent
Kurfiss et al.

(10) Patent No.: US 11,196,376 B2
(45) Date of Patent: Dec. 7, 2021

(54) ELECTRIC MACHINE

(71) Applicant: Robert Bosch GmbH, Stuttgart (DE)

(72) Inventors: Jochen Kurfiss, Lomersheim (DE); Ulrich Vollmer, Weilheim (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 16/626,381

(22) PCT Filed: Jun. 7, 2018

(86) PCT No.: PCT/EP2018/065012
§ 371 (c)(1),
(2) Date: Dec. 24, 2019

(87) PCT Pub. No.: WO2019/015858
PCT Pub. Date: Jan. 24, 2019

(65) Prior Publication Data
US 2020/0136547 A1   Apr. 30, 2020

(30) Foreign Application Priority Data

Jul. 21, 2017 (DE) ..................... 10 2017 212 568.3

(51) Int. Cl.
*H02P 27/08* (2006.01)
*H02P 21/22* (2016.01)
(Continued)

(52) U.S. Cl.
CPC ............ *H02P 27/08* (2013.01); *H02M 7/537* (2013.01); *H02P 21/22* (2016.02); *H02P 23/00* (2013.01); *H02P 25/22* (2013.01)

(58) Field of Classification Search
CPC .......... H02P 27/08; H02P 25/22; H02P 21/22; H02P 23/00; H02P 1/00; H02P 1/04;
(Continued)

(56) References Cited

U.S. PATENT DOCUMENTS

| 7,659,686 B2 * | 2/2010 | Osada | H02P 21/06 |
| | | | 318/771 |
| 8,604,730 B2 * | 12/2013 | Suzuki | H02M 1/14 |
| | | | 318/400.02 |

(Continued)

FOREIGN PATENT DOCUMENTS

| DE | 10 2005 043 576 A1 | 3/2007 |
| DE | 10 2009 028 081 A1 | 4/2010 |

(Continued)

OTHER PUBLICATIONS

International Search Report corresponding to PCT Application No. PCT/EP2018/065012, dated Sep. 10, 2018 (German and English language document) (5 pages).

*Primary Examiner* — Antony M Paul
(74) *Attorney, Agent, or Firm* — Maginot, Moore & Beck LLP

(57) ABSTRACT

An electric machine has at least two sub-machines, each having the same number of phases and being designed to generate a magnetic rotary field independently of one another to rotate the rotor. The machine has a power output stage for each sub-machine, each being designed to energize the sub-machines independently of one another. The machine also has at least one or only one control unit which is connected to the power output stages and is designed to generate a PWM signal in order to actuate the power output stages. The control unit is designed to generate the PWM signal for the sub-machines such that each of the PWM pulses for a sub-machine begins at a starting time of a PWM period and/or to generate the PWM pulses for another sub-machine such that each of the PWM pulses ends at an end time of the PWM period for the other sub-machine.

10 Claims, 3 Drawing Sheets

(51) Int. Cl.
*H02M 7/537* (2006.01)
*H02P 23/00* (2016.01)
*H02P 25/22* (2006.01)

(58) Field of Classification Search
CPC ...... H02P 1/46; H02P 3/00; H02P 6/00; H02P 1/42; H02P 3/12; H02P 6/08; H02P 21/00; H02P 27/00; H02P 27/04; H02P 27/06; H02M 7/537
See application file for complete search history.

(56) References Cited

U.S. PATENT DOCUMENTS 8,604,739 B2 * 12/2013 Atarashi ............... B60L 15/007
  318/494
9,692,342 B2 *  6/2017 Kano .................... B62D 5/046

FOREIGN PATENT DOCUMENTS

JP    2009-118621 A   5/2009
WO    2010/110483 A2  9/2010

\* cited by examiner

ELECTRIC MACHINE

This application is a 35 U.S.C. § 371 National Stage Application of PCT/EP2018/065012, filed on Jun. 7, 2018, which claims the benefit of priority to Serial No. DE 10 2017 212 568.3, filed on Jul. 21, 2017 in Germany, the disclosures of which are incorporated herein by reference in their entirety.

BACKGROUND

The disclosure relates to an electric machine, in particular an electric motor and/or generator. The electric machine has a stator and a rotor. The machine has at least two sub-machines, each having the same number of phases. The sub-machines preferably each have a portion of stator coils of the stator and are each designed to generate, independently of each other, a rotating magnetic field to rotate the rotor. The machine preferably has a power output stage for each sub-machine, wherein the power output stages are each designed to energize the sub-machines independently of each other. The machine also has at least one or only one control unit, which is connected to the power output stages and is designed to generate a PWM signal (PWM=pulse width modulation) to actuate the power output stages. The sub-machines preferably each have, for each phase, at least one, at least two, at least three, or only one stator coil.

DE 10 2005 043 576 A1 discloses a method for operating an electric machine which has at least two electrically isolated stator windings, wherein the first stator winding is fed by a first partial converter and the second stator winding is fed by a second partial converter. The partial converters are controlled by offset pulsed signals.

SUMMARY

According to the disclosure, the control unit is designed to generate the PWM signal for the sub-machines such that the PWM pulses for a sub-machine each start at a start time of a PWM period, and/or to generate the PWM pulses for a further sub-machine such that the PWM pulses each end at an end time of the PWM period for the further sub-machine. By means of the control unit designed in this way, the PWM pulses for one of the sub-machines can each be generated in particular in a left-aligned arrangement, starting together at the start of the PWM period, wherein the PWM pulses for the further sub-machine can each be generated in particular in a right-aligned arrangement, ending together at the end of the PWM period.

A switching-pulse-free time interval is thus advantageously formed, in which a phase current connected from the power output stage to a stator coil of a sub-machine is not switched on or off. Specifically, it was recognized that switching the stator coil current on or off caused EMC problems which can adversely affect or render impossible any current detection of the stator coil current.

In another variant, the control unit is designed to generate the PWM signal for the sub-machines such that the PWM pulses for a sub-machine each start or end at a start time of a PWM period, and to generate the PWM pulses for a further sub-machine in a center-aligned arrangement. In this way, switching-pulse-free time windows for current detection can be advantageously generated for a modulation range.

In another preferred variant, the control unit is designed to generate the PWM signal for the sub-machines such that the PWM pulses for at least two or all sub-machines each start or end at a start time of a PWM period. In this way, by the thus formed PWM actuation of the power output stages, a time interval for current detection can be advantageously formed over a large modulation range of the machine.

In a preferred embodiment, the control unit has a pulse width modulator which is designed to change a duty cycle for at least one or a plurality of PWM periods, and thus to change a modulation of the machine, in particular of the sub-machines. The PWM modulator is preferably designed to generate the pulse-width-modulated pulses for a sub-machine, wherein said pulses start together, in particular in a left-aligned arrangement, or end together, in particular in a right-aligned arrangement, relative to the PWM period.

The control unit preferably has a processing unit which is formed by a microprocessor, a microcontroller or an FPGA (FPGA=field programmable gate array). The control unit preferably has at least one driver for the power output stages, said driver being connected, on the output side, to control connections to the power output stages, and being designed to generate a control signal to switch the semiconductor switches of the power output stages on or off, depending on the PWM signal, and to send said control signal to the power output stages.

In a preferred embodiment, the machine has at least one current sensor connected to the control unit, said current sensor being designed to detect the phase current of at least one phase or all phases of the sub-machine. The control unit is designed to detect the phase current of at least one phase of the sub-machine during a common pulse pause of the PWM periods of the sub-machines. Advantageously, there is a time window, in particular a time interval during a PWM period, during which no switching operations occur to switch the power output stage, caused by a PWM pulse, in particular a start or an end of a PWM pulse, during the aforesaid left-aligned actuation of the sub-machine, and a right-aligned actuation of another different sub-machine of the sub-machines, formed within a larger modulation range, in comparison to a center-aligned actuation of a sub-machine.

In a preferred embodiment, the control unit is designed to generate the PWM periods phase-shifted relative to each other for sub-machines differing from each other. The phase shift, also called phase displacement, between the actuation of the sub-machine and the actuation of the further sub-machine is preferably between 30 and 70 percent of a PWM period duration, further preferably between 34 and 66 percent of a PWM period duration, and particularly preferably 50 percent of a PWM period duration. By means of the control unit designed in this way, a load reduction in an electrical intermediate circuit, in particular one used jointly by the sub-machines, arises for at least a portion of a modulation range of the sub-machines, wherein the intermediate circuit comprises an intermediate circuit capacitor. Due to the time-offset actuation of the sub-machines, a voltage fluctuation in an on-board electrical system, caused by a ripple current in the intermediate circuit, can be advantageously reduced. Further advantageously, due to the phase shift, in particular in conjunction with the left-aligned and right-aligned actuation of sub-machines differing from each other, a time window free of switching pulses is designed for current measurement over a wide modulation range. The current measurement of a phase current thus cannot be electromagnetically disturbed by the switching pulses to switch the semiconductor switches of the power output stages. Advantageously, due to a current measurement in a time interval, previously also called a time window, in which no switching operations on the power output stage occur, a current measurement resistor can be of particularly small, and thus particularly low-loss, design. A measuring voltage, dropped across the current measurement resistor and representing the detected current, can thus be very small, and can be amplified—for example by means of a measurement amplifier—and thus magnified, for evaluation by the control unit.

In a preferred embodiment, the control unit is designed to lengthen or to shorten the duty cycle for all phases of a sub-machine by a pre-determined time interval. In this way, a voltage offset can be added to or subtracted from an actuation of a sub-machine, without any electrical influence on the actuation of the sub-machine. The voltage offset, however, advantageously has the effect that the time window for switching-pulse-free current detection is correspondingly large, for large modulation values too.

In a preferred embodiment, the control unit is designed to lengthen or to shorten a pulse duration of a high-side pulse and of a low-side pulse in an alternating manner to each other. In this way, the thermal load on the power output stage can be reduced when the voltage offset is generated.

The power output stage preferably comprises at least one semiconductor switch half-bridge for each phase. The semiconductor switch half-bridge comprises a low-side semiconductor switch and a high-side semiconductor switch which are connected in series to each other. Advantageously, the high-side and the low-side semiconductor switches of the power output stage, in particular of semiconductor switch half-bridges of the power output stage, can be thermally loaded in an alternating manner to each other.

In a preferred embodiment, the control unit is designed to generate a current detection interval and to detect the current during the current detection interval. The control unit is further preferably designed to generate the current detection interval during a common pulse pause in the actuation of the sub-machines.

The disclosure also relates to a control unit for an electric machine. The control unit comprises the previously described control unit which is connected to the power output stages on the output side. The power output stage is designed to be connected to a sub-machine formed of a portion of the stator coils of the stator, and to this end has an output connection to connect to the stator.

The disclosure also relates to a method for actuating an electric machine. The machine has at least two sub-machines. The sub-machines each have the same number of stator coils of a stator of the machine. In the method, pulse-width-modulated pulse patterns comprising a plurality of PWM pulses are generated to actuate the stator coils, wherein the PWM pulses for a sub-machine each start at a start time of a PWM period and the PWM pulses for a further sub-machine each end at an end time of the PWM period for the further sub-machine.

In this way, an advantageously large time window for switching-pulse-free current detection can be formed in the machine.

Preferably, with the method, a current flowing through at least one of the stator coils is detected current within a current detection interval during a common pulse pause of the pulses for the sub-machines. Advantageously, a current measuring window, formed by a time interval free of switching operations of the power output stage, can be larger than with a center-aligned PWM actuation.

In the method, the PWM periods of the sub-machine and the further sub-machine are each preferably phase-shifted relative to each other. A phase shift is preferably between 37 and 66 percent of a period duration, further preferably half the PWM period duration. Advantageously, and preferably in conjunction with the previously described left-aligned or right-aligned PWM generation, an intermediate circuit load reduction thus can be formed. The PWM periods of all the sub-machines are preferably each of the same duration. In this way, an actuation of the sub-machines can occur in a time-synchronous manner to each other.

BRIEF DESCRIPTION OF THE DRAWINGS

The disclosure is now described below with the aid of figures and further exemplary embodiments. Further advantageous embodiments arise from the features described in the figures.

DETAILED DESCRIPTION

Figure 1:
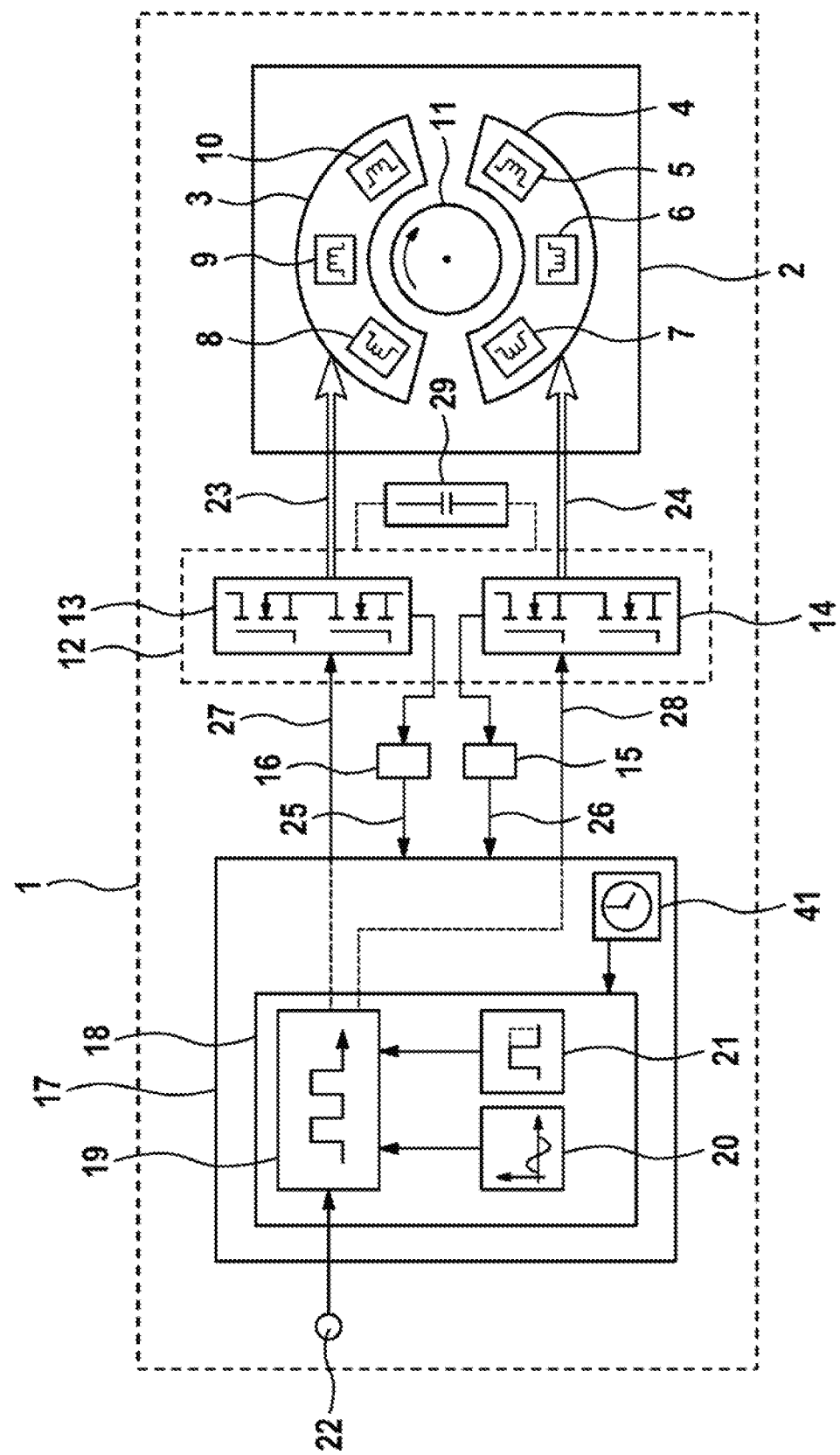
FIG. 1 shows an exemplary embodiment of an electric machine with an inverter, wherein the inverter has a control unit which is designed to generate PWM pulses for a sub-machine such that semiconductor switch half-bridges of the inverter can be switched on together at a common start time or switched off at a common end time.

FIG. 1 shows—schematically—an exemplary embodiment of an electric machine 1. The electric machine 1 has a stator 2. In this exemplary embodiment, the stator 2 comprises two sub-machines which are each of three-phase design and also each have three stator coils. In this exemplary embodiment, a sub-machine 3 comprises the stator coils 8, 9 and 10. A further sub-machine 4 of the sub-machines has the stator coils 5, 6 and 7. The machine 1 also comprises a rotor 11, which is for example permanently magnetic or separately excited. The machine 1 also has an output stage 12 which, in this exemplary embodiment, is formed of two partial output stages 13 and 14. Each of the partial output stages 13 and 14 has a B6 bridge, wherein the B6 bridge comprises three semiconductor switch half-bridges. The semiconductor switch half-bridge comprises a low-side semiconductor switch and a high-side semiconductor switch. A semiconductor switch half-bridge is designed to generate a phase current for one phase of the sub-machine. The partial output stage 13 is connected by an electric connection 23 to the sub-machine 3 on the output side. The partial output stage 14 is connected by an electric connection 24 to the sub-machine 4 on the output side. The partial output stage 13 is designed to energize the stator coils 8, 9 and 10 of sub-machine 3 to generate a rotating magnetic field to rotate the rotor 11. The partial output stage 14 is designed to energize the stator coils 5, 6 and 7 of the sub-machine 4 to generate a rotating magnetic field to rotate the rotor 11. The partial output stages 13 and 14 can, independently of each other, together with the sub-machines 3 and 4 respectively, excite the rotor 11 to rotate. In this way, the machine 1 has two sub-machines which are independent of each other and can move the rotor 11 together in normal operation, or if one sub-machine should be faulty, the remaining sub-machine can continue to move the rotor 11.

The machine 1 also has a control unit 17. The control unit 17 is connected on the output side by means of a connecting cable 27 to the output stage 12, and there to the partial output stage 13, and is designed to actuate the sub-machine 13 by means of the connecting cable 27, and also to generate a control signal, in particular a pulse pattern, and to send said control signal to the partial output stage 13. The control unit 17 is connected on the output side to the partial output stage 14 by means of a connecting cable 28 and is designed to actuate the partial output stage 14, in particular control connections of the partial output stage 14, to energize the sub-machine 4. The machine 1 also has a current sensor 16 to detect a current of the partial output stage 13, and a current sensor 15 to detect a current of the partial output stage 14. The current sensors 15 and 16 are formed, for example, by a shunt resistor. The partial output stages 13 and 14 can—in contrast to the arrangement shown in FIG. 1—also be connected by means of a common current sensor. In addition, the partial output stages 13 and 14 can each have a current detection resistor for each phase, and thus for each semiconductor switch half-bridge.

In this exemplary embodiment, the control unit 17 is designed to actuate the sub-machines 3 and 4 phase-shifted relative to each other. A phase shift is, for example, between 33 and 67 percent of a PWM period duration. In this way, there can be a load reduction on an intermediate circuit capacitor 29 used jointly by the partial output stages 13 and 14. The current sensor 16 is connected to the control unit 17 on the output side by means of a connecting cable 25. The current sensor 15 is connected to the control unit 17 on the output side by means of a connecting cable 26. The current sensors 16 and 15 are each designed to detect a current flowing in the respective partial output stage 13 or 14, and to generate a current signal representing the current and to send said current signal to the control unit 17 on the output side.

The control unit 17 has a pulse pattern generator 18. The pulse pattern generator 18 is designed to generate pulse-width-modulated control signals to actuate the power output stage 12, in particular control connections of the power output stage 12, and to output them on the output side. Additionally, the pulse pattern generator 18 has a pulse-width modulator 19. The pulse-width modulator 19 has one input 22 and is designed, depending on a control signal, in particular an amplitude signal, received at the input 22, to generate a duty cycle between a PWM pulse duration and a pulse pause duration and to generate the control pulses for switching the semiconductor switches of the power output stage 12 on and off in the duty cycle.

The pulse-width modulator 19 is connected to an actuation pattern generator 20 on the input side. In this exemplary embodiment, the actuation pattern generator is designed to generate an actuation signal for each phase, and thus for each sub-machine stator coil corresponding to the phase. The actuation signal represents, for example, a sine wave form or additionally a third harmonic corresponding to the sine wave form—as the fundamental oscillation.

The control unit 17 is designed to detect the current signal generated by the current sensors 15 and 16, at least at a current detection time, or within a current detection interval which is in the time range or at the time of half the duration of a control pulse. The control unit 17 can thus detect the current flowing in the power output stage, in particular in the partial output stages 13 and 14—in particular at the time of a pulse center of the control pulses generated by the PWM modulator. The PWM modulator 19 is designed, for example, to generate the control pulses starting together or ending together within a pulse period. The current detection occurs, for example, during a pulse pause in a PWM period. The control unit 17, in particular the actuation pattern generator 20, is designed to actuate the sub-machines 3 and 4 phase-shifted relative to each other. In addition, the PWM modulator 19 is designed, for example, to generate the control pulses phase-shifted relative to each other for sub-machines differing from each other. A phase shift between the pulse patterns for the sub-machines 3 and 4 is, for example, half the duration of a pulse period.

The control unit 17 is designed to start the PWM pulses for the sub-machine 3 together and to end the PWM pulses for the further sub-machine 4 together. A start of a PWM pulse corresponds to the switching-on of the half-bridge of a power output stage and thus to the connection of a stator coil to the intermediate circuit potential for the stator coil connected to the power output stage, and an end of a PWM pulse corresponds to the switching-off of the half-bridge and thus to the connection of a stator coil to the intermediate circuit ground potential.

The control unit 17 is designed in this exemplary embodiment to change, in particular to lengthen or to shorten, depending on the modulation level of the PWM actuation, the duration of the control pulses for the sub-machine at least for the current detection duration or continuously at least for a period cycle or several period cycles, and thus to generate a voltage offset by means of the PWM pattern for the sub-machine. In this way, a time interval for the current measurement in a modulation range can also be increased.

The control unit 17, in this exemplary embodiment the pulse pattern generator 18, also has an adder 21, designed, should a switching edge be encountered within the current detection interval, to increase the duration of the control pulses for the sub-machine and also to generate a lengthened control pulse such that the switching edge lies outside the current detection interval. The pulse pattern generator 18 is connected to a timer 41 on the input side, and is designed to receive a time clock signal generated by the timer 41 and representing a time clock, and to generate the PWM signal depending on the time clock signal. The timer 41 is formed, for example, by a crystal oscillator.

Figure 2:
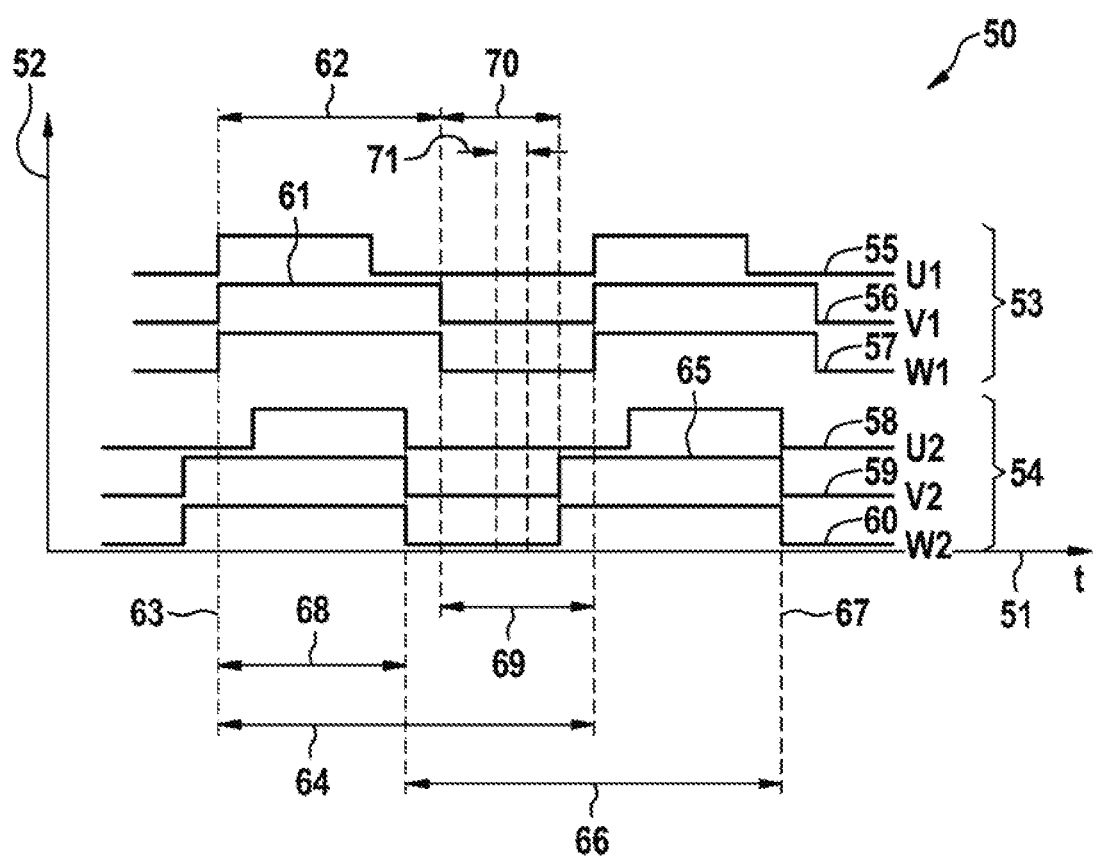
FIG. 2 shows a graph with PWM patterns generated by the control unit shown in FIG. 1.

FIG. 2 is a graph showing the PWM actuation signals generated by the PWM modulator 19, shown in FIG. 1, for the sub-machine 3 and the sub-machine 4. The graph 50 has a time axis 51 and an amplitude axis 52. An amplitude of the PWM pulses, generated by the pulse width modulator 19, is plotted on the amplitude axis 52. The graph 50 shows a PWM actuation pattern 53 for the sub-machine 3, which is formed of the stator coils 8, 9 and 10 of the stator 2, and a PWM actuation pattern 54 for the sub-machine 4, which is formed of the stator coils 5, 6 and 7 of the stator 2. The actuation pattern 53 comprises a PWM signal 55, representing a PWM pulse sequence, to actuate the power output stage 13 and thus to energize the stator coil 8, a PWM signal 56, representing a PWM pulse sequence, to energize the stator coil 9 and a PWM signal 57, representing a PWM pulse sequence, to energize the stator coil 10. The PWM actuation pattern 54 comprises a PWM signal 58, representing a PWM pulse sequence, to actuate the power output stage 14, and thus to energize the stator coil 5, a PWM signal 59, representing a PWM pulse sequence, to energize the stator coil 6 and a PWM signal 60, representing a PWM pulse sequence, to energize the stator coil 7.

The PWM signals comprise in each case chronologically consecutive PWM pulses, of which a PWM pulse 61 from PWM pulse sequence 56 is described by way of example. The PWM pulse 61 has a pulse duration 62 and starts at a start time 63 of a PWM period which has a PWM period duration 64. The PWM pulse 61 is followed by a pulse pause 69 which ends at the end of the PWM period duration. At the start time, the stator coil 9, corresponding to the PWM pulse 61 and illustrated in FIG. 1, is energized, and at the end of the PWM pulse 61, the current is switched off.

The pulse width modulator 19 in FIG. 1 is designed to generate the PWM pulse sequences 58, 59 and 60 for the sub-machine 4 synchronously to each other with a pulse period duration 66. A PWM pulse 65 in PWM pulse sequence 59 for the stator coil 9 of the sub-machine 4 is described by way of example. The PWM pulses of the PWM actuation pattern 54, in particular PWM pulse sequences 58, 59 and 60, all end together at an end time 67 of the PWM period 66.

The PWM period 64 of the PWM actuation pattern 53 for the sub-machine 3, and the PWM period 66 of the PWM actuation pattern 54 for the sub-machine 4 are phase-shifted relative to each other. The PWM modulator 19 in FIG. 1 is designed to generate, with a phase shift, the PWM pulses for the sub-machines 3 and 4 differing from each other independently of each other and out of phase relative to each other. The phase shift 68 between the actuation patterns 53 and 54 is 50 percent of the PWM period duration in this exemplary embodiment. The PWM period durations of the PWM periods 64 and 65 are the same length in this exemplary embodiment.

With the modulation level of the sub-machines 3 and 4 shown in graph 50 in FIG. 2, said level being represented by the PWM actuation patterns 53 and 54, a time interval 70 free of switching pulses remains, in which a current detection can be carried out, by the current sensor 16 shown in FIG. 1 or the current sensor 15, without interference from switching pulses, caused by the switching on or off of a semiconductor switch of the power output stages 13 or 14. The time interval 70 is particularly long due to the PWM pulses in the PWM actuation pattern 53, which start together in a left-aligned arrangement at the start time 63 of the PWM period 64, and due to the PWM pulses of the PWM actuation pattern 54, which—in particular in a right-aligned arrangement—end together at the switch-off time 67, previously also called end time, at the end of the PWM period 66.

The graph 50 also shows a current detection interval 71, in which the phase currents of the sub-machines 3 and 4 can be detected by the control unit 17 shown in FIG. 1 by means of the current sensors 15 and 16—simultaneously in this exemplary embodiment. The current detection interval 71 is, for example, determined by sampling, in particular by analog-digital conversion of a time-current curve, and by determining a mean current value in the current detection interval 71 at the corresponding power output stage.

Due to the phase offset 68, the load on the intermediate circuit capacitor 23 shown in FIG. 1 can be advantageously reduced. Further advantageously, due to the phase shift 68 in conjunction with the PWM pulses of the PWM actuation pattern 53, which start together at the start time 63 of the pulse period 64, and the PWM pulses of the PWM actuation pattern 54, which end together at the end time 67 of the PWM period 65 for the further sub-machine, the time interval 70 representing a time window for interference-free, in particular switching-pulse-free, current detection, can be particularly long.

Figure 3:
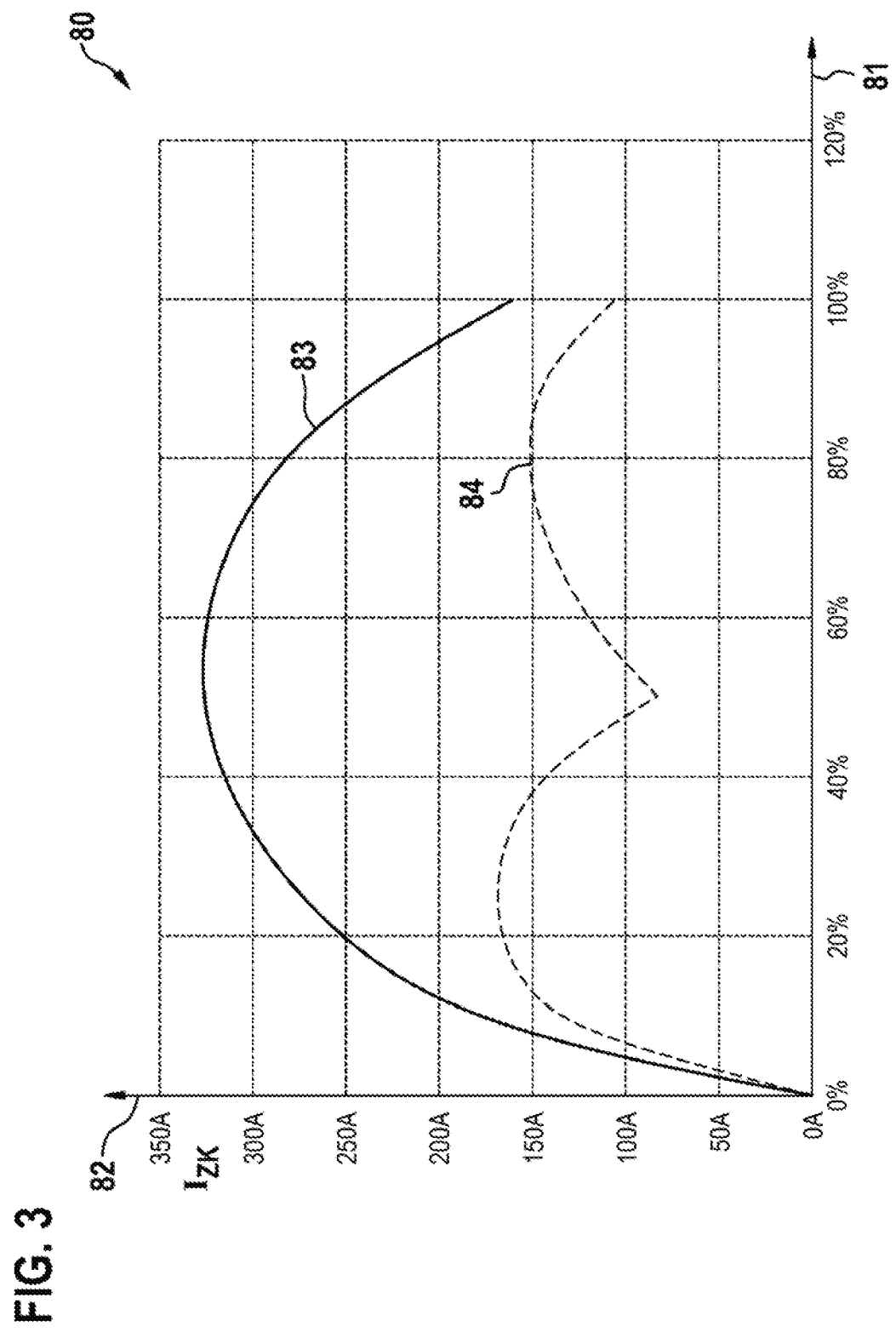

FIG. 3 shows a graph 80. The graph 80 has an x-axis 81 which represents a modulation level of the machine 1 shown in FIG. 1. A y-axis 82 in graph 80 represents a mean ripple current in the intermediate circuit, representing a current fluctuation in the intermediate circuit. A curve 83 represents a ripple current depending on the modulation level of a machine with two sub-machines which are each actuated center-aligned and without a phase shift. A curve 84 represents a ripple current depending on the modulation level of a machine with two sub-machines, wherein as shown in FIG. 2 one sub-machine is actuated left-aligned and the other sub-machine right-aligned, and wherein the PWM signals of the sub-machines have a phase shift to each other of 50 percent of the PWM period duration. The figure shows that, by separated switching operations of the sub-machines, achieved by the actuation as claimed in curve 84, the ripple current in the intermediate circuit can be halved in comparison to the center-aligned actuation without a phase shift as in curve 83.

The invention claimed is:

1. An electric machine comprising:
    a stator;
    a rotor;
    at least two sub-machines, each of the at least two sub-machines having a same number of phases, each of the at least two sub-machines including a portion of stator coils of the stator, each of the at least two sub-machines being configured to generate, independently of each other, a rotating magnetic field to rotate the rotor;
    at least two power output stages, each of the at least two power output stages corresponding to a respective one of the at least two sub-machines; and
    at least one control unit connected to the at least two power output stages, and configured to generate PWM signals to actuate each of the at least two power output stages, the at least one control unit being configured to generate a plurality of PWM signals for a first sub-machine of the at least two sub-machines such that PWM pulses of each of the plurality of the PWM signals for the first sub-machine each start at a start time of a first PWM period for the first sub-machine.

2. The electric machine as claimed in claim 1, wherein the at least one control unit is configured to generate a plurality of PWM signals for a second sub-machine of the at least two sub-machines such that PWM pulses of the plurality of PWM signals for the second sub-machine each end at an end time of a second PWM period for the second sub-machine.

3. The electric machine as claimed in claim 2, wherein the at least one control unit is configured to generate the first PWM period and the second PWM period phase-shifted relative to each other.

4. The electric machine as claimed in claim 1 further comprising:
    at least one current sensor connected to the at least one control unit, the at least one current sensor being configured to detect a phase current of at least one phase the at least two sub-machines,
    wherein the at least one control unit is configured to detect the phase current of the at least one phase of the at least two sub-machine during a common pulse pause of PWM periods of the at least two sub-machines.

5. The electric machine as claimed in claim 1, wherein the at least one control unit is configured to one of lengthen and shorten a duty cycle for all phases of a sub-machine of the at least two sub-machines by a pre-determined time interval.

6. The electric machine as claimed in claim 5, wherein the at least one control unit is configured to one of lengthen and shorten a pulse duration of a high-side pulse and of a low-side pulse in an alternating manner to each other.

7. The electric machine as claimed in claim 1, wherein the at least one control unit is configured to (i) generate a current detection interval during a common pulse pause of the at least two sub-machines and (ii) detect a current during the current detection interval.

8. A method for actuating an electric machine including at least two sub-machines, each having a same number of stator coils, the method comprising:
    generating pulse-width-modulated pulse patterns having a plurality of PWM pulses to actuate the stator coils of each of the at least two sub-machines, PWM pulses of the plurality of PWM pulses for a first sub-machine of the at least two sub-machines each starting at a start time of a first PWM period for the first sub-machine and PWM pulses of the plurality of PWM pulses for a second sub-machine of the at least two sub-machines each ending at an end time of a second PWM period for the second sub-machine.

9. The method as claimed in claim 8 further comprising: detecting a current flowing through at least one of the stator coils of the at least two sub-machines within a current detection interval during a common pulse pause of the plurality of PWM pulses for the at least two sub-machines.

10. The method as claimed in claim 8, wherein the first PWM period and the second PWM period are each phase-shifted relative to each other.

\* \* \* \* \*